United States Patent

[11] 3,551,593

[72] Inventors Henri L. Gaudriot
1 Highland Heights, Rochester, N.Y. 14618;
LeRoy J. Ryan, Jr., 5300 W. Hutchinson, Chicago, Ill. 60641

[21] Appl. No. 715,593
[22] Filed Mar. 25, 1968
[45] Patented Dec. 29, 1970

[54] PARTS COUNTER
16 Claims, 11 Drawing Figs.

[52] U.S. Cl. .......... 178/6
[51] Int. Cl. .......... H04n 7/18, H04n 7/02
[50] Field of Search .......... 250/219DG, 219ICR, 219IA; 356/158, 163, 167, 168, 200, 237

[56] References Cited
UNITED STATES PATENTS

| | | | |
|---|---|---|---|
| 2,803,406 | 8/1957 | Nuttall | 178/6 |
| 3,369,222 | 2/1968 | Webb | 235/92 |

*Primary Examiner*—Robert L. Griffin
*Assistant Examiner*—Barry Leibowitz
*Attorney*—Kinzer, Dorn, Zickert

ABSTRACT: An electronic parts counter including a comparative video scanning unit and a parts supporting platform mounted to be vibrated at predetermined frequencies for predetermined durations between scanning operations and lighted from different angles and intensities during the counting operations.

INVENTORS
HENRI L. GAUDRIOT
LE ROY J. RYAN, JR.

BY *Mazyall, Johnston, Cook & Root*
ATTORNEYS

FIG.4
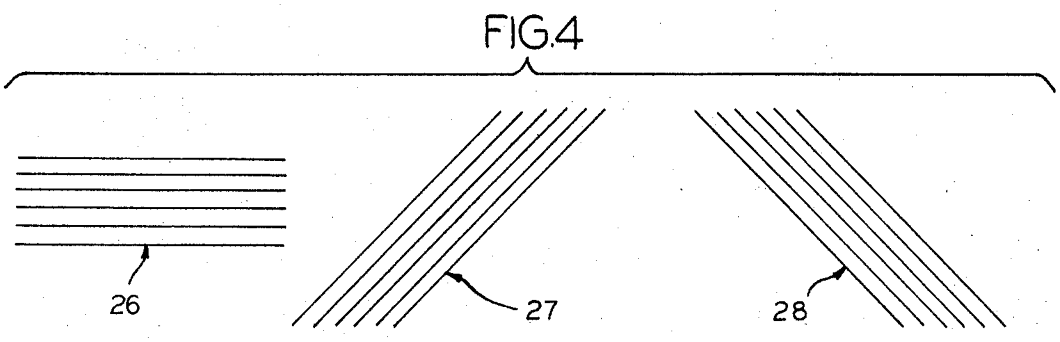
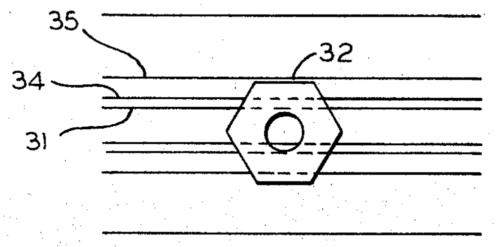
FIG.5
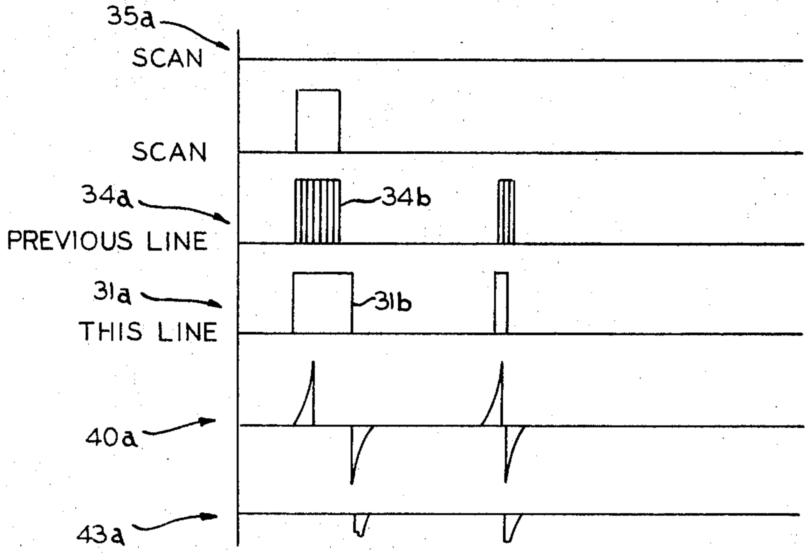
FIG.6
| | THIS LINE | PREVIOUS LINE | OUTPUT |
|---|---|---|---|
| OUTPUT = $(\overline{P.L.})(T.L.)$ | 1 | 0 | 1 |
| NO OUTPUT = $(\overline{P.L.})(\overline{T.L.})$ | 0 | 0 | 0 |
| NO OUTPUT = $(P.L.)(T.L.)$ | 1 | 1 | 0 |
| NO OUTPUT = $(P.L.)(\overline{T.L.})$ | 0 | 1 | 0 |
TRUTH TABLE
FIG.7
INVENTORS
HENRI L. GAURIOT
LE ROY J. RYAN, JR.
BY
Mazzell, Johnston, Cook & Root
ATTORNEYS INVENTORS
HENRI L. GAUDRIOT
LE ROY J. RYAN, JR.
BY
Mayall, Johnston, Cook & Root
ATTORNEYS

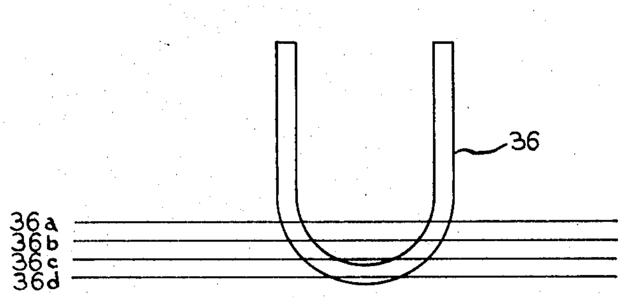
FIG. 9
| | | | | | | | | | | |
|---|---|---|---|---|---|---|---|---|---|---|
| 36 a | 1 | 1 | 0 | 0 | 0 | 0 | 0 | 0 | 1 | 1 |
| 36 b | 0 | 1 | 1 | 0 | 0 | 0 | 0 | 1 | 1 | 0 |
| 36 c | 0 | 0 | 1 | 1 | 0 | 0 | 1 | 1 | 0 | 0 |
| 36 d | 0 | 0 | 0 | 1 | 1 | 1 | 1 | 0 | 0 | 0 |
FIG. 10
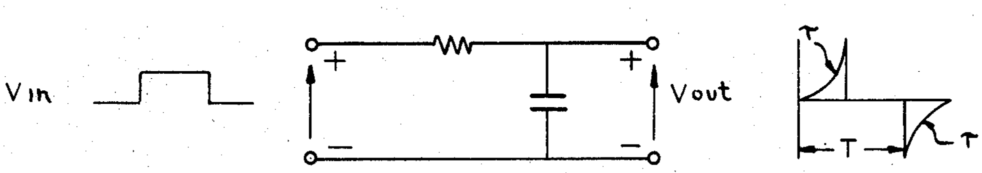
FIG. 11
INVENTORS
HENRI L. GAUDRIOT
LE ROY J. RYAN, JR.
BY
Mayall, Johnston, Cook & Root
ATTORNEYS

PARTS COUNTER

The present invention relates to counting apparatus for use in static counting of piece parts electronically at high speed and with zero error count, and more particularly to a counter that employs comparative video scanning and count resolution.

Heretofore, counting of piece parts has been generally conducted by ratio weighing operations. However, where a high number of piece parts was manufactured by a set of tools, because of tool wear, the tolerances of the piece parts vary. Such counting by ratio weighing operations did not compensate for this tolerance, thereby resulting in inaccurate counting operations.

The parts counter of the present invention contemplates a relatively compact unit, about the size of a vertical type projector for projecting written material from a transparent film onto a wall mounted screen. Counting of piece parts is accomplished electronically at high speed and accuracy where essentially a zero error count is obtained. The piece parts are static during a part of the overall counting operation, and are supported on a preferably transparent or translucent platform that is mounted to be vibrated between counts and cause the piece parts to lie in the same plane during the counts and not be piled one on top of the other, and to reorient the piece parts between counting steps. Illumination from different angles in combination with bottom lighting through the transparent platform is provided to enhance the video counting operation.

The piece parts may be fed to the counting platform by a hopper or any suitable means, and subsequent to a complete counting operation, may be removed therefrom or delivered elsewhere by suitable means.

A video scanner would be arranged above the platform to scan the image area of the platform and deliver information to an electronic analyzer. Following one complete scanning operation of the image area, the platform would be vibrated in order to reorient the piece parts, after which another scanning operation would be conducted. A comparison in counts of each scanning operation would be made by the electronic analyzer, and when a predetermined number of duplicate counts would be obtained or following a predetermined number of counts, the counting device would stop and duplicate count or count most often appearing would be used as the result. In addition to vibrating of the platform between counting operations, the scanner may be rotated to scan along a different path. Likewise the angles and intensity of platform illumination may be changed to enhance the video operation. While any type of vibrator may be employed, preferably an acoustical shaker at a frequency, intensity, and duration that would vary depending upon the configuration of the piece part to be counted, would be employed. The video scanner would conduct sequential image area line scans, and following a first scanning operation, it may be rotated to scan along a path of 45°, 90°, or the like relative to the previous scanning path.

The scanning operations will be preprogrammed according to the configuration of the piece part, as will be the necessary overall operation of the counter. For example, in counting of some piece parts, it may be only necessary to obtain two or three duplicate counts by two or three scanning operations at different angular positions, while in counting of other piece parts, it may be necessary to conduct 10 scanning operations to obtain more than three duplicate counts. In either situation, the direction of successive scanning paths, together with the number of scanning paths for any counting of a group of piece parts, the frequency, intensity and vibration duration of the vibrated platform, and the light angle and intensities would be programmed. It would also be necessary to program into the analyzer the configuration of the piece parts.

Accordingly, it is an object of the present invention to provide a new and improved parts counter that is capable of providing high speed and accurate counting of piece parts, regardless of piece part tolerance variances.

Another object of this invention resides in the provision of a parts counter that includes an electronic apparatus for counting of piece parts by comparative video scanning of the parts placed on the platform.

Other objects, features and advantages of the invention will be apparent from the following detailed disclosure, taken in conjunction with the accompanying sheets of drawings, wherein like reference numerals refer to like parts, in which.

Figure 8:
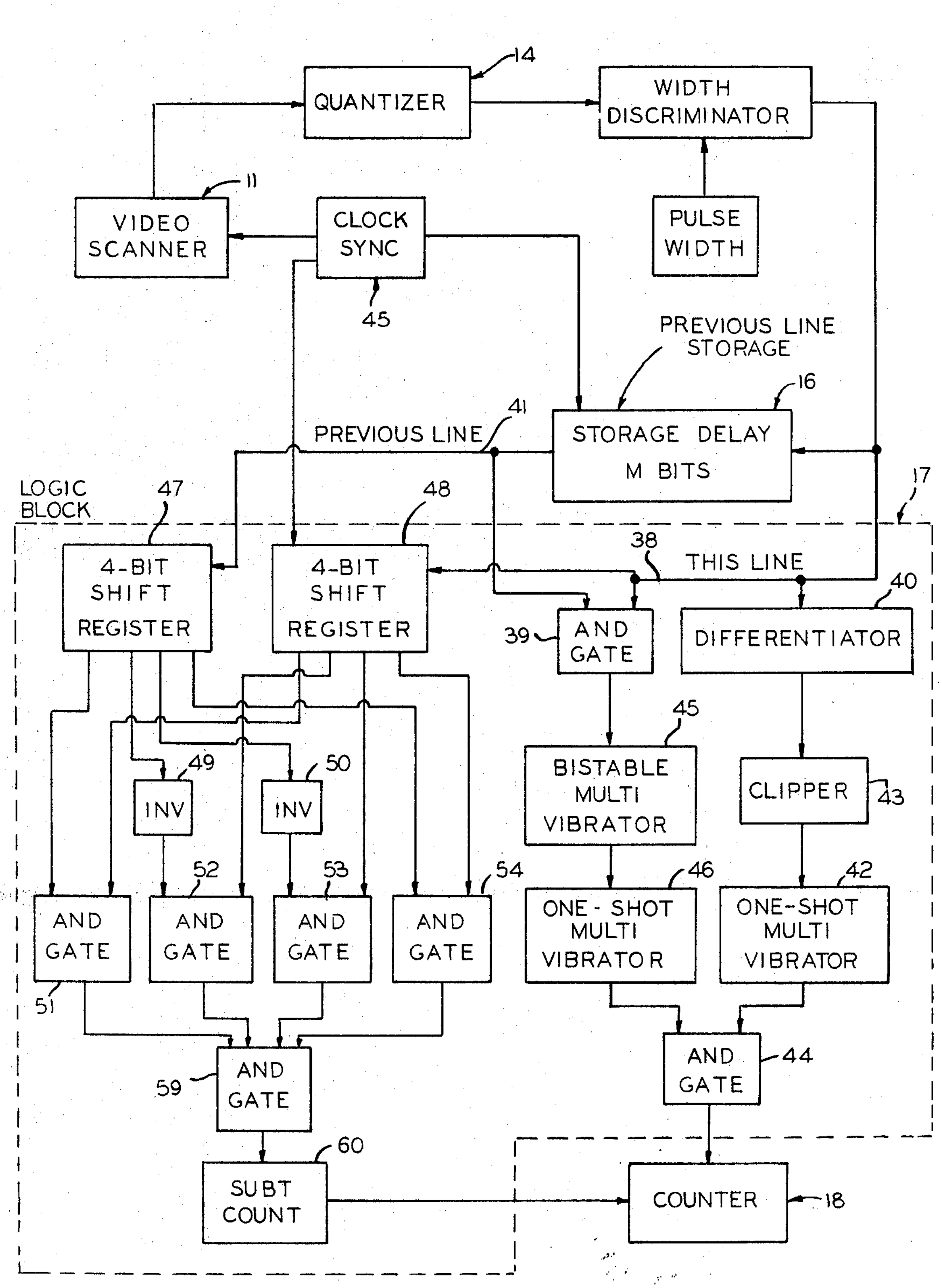

FIG. 4. is a diagrammatic illustration of a plurality of scanning paths that may be employed in a counting operation;

FIG. 5 is a representation of a scanned image area with piece parts thereon;

FIG. 6 is a graphical illustration of pulse patterns in analogue relating to the scan of FIG. 5;

FIG. 7 is a truth table illustrating when a count is to be extracted from a line scan;

FIG. 8 is a more detailed block diagram of the parts counter according to the present invention;

FIG. 9 is a representation of a U-shaped part and representative scans across the bight portion;

FIG. 10 is a bit diagram relating to the scans of the U-shaped piece part of FIG. 9; and FIG. 11 is a diagrammatic view of an RC circuit, and illustrating input and output signals for same.

Figure 1:
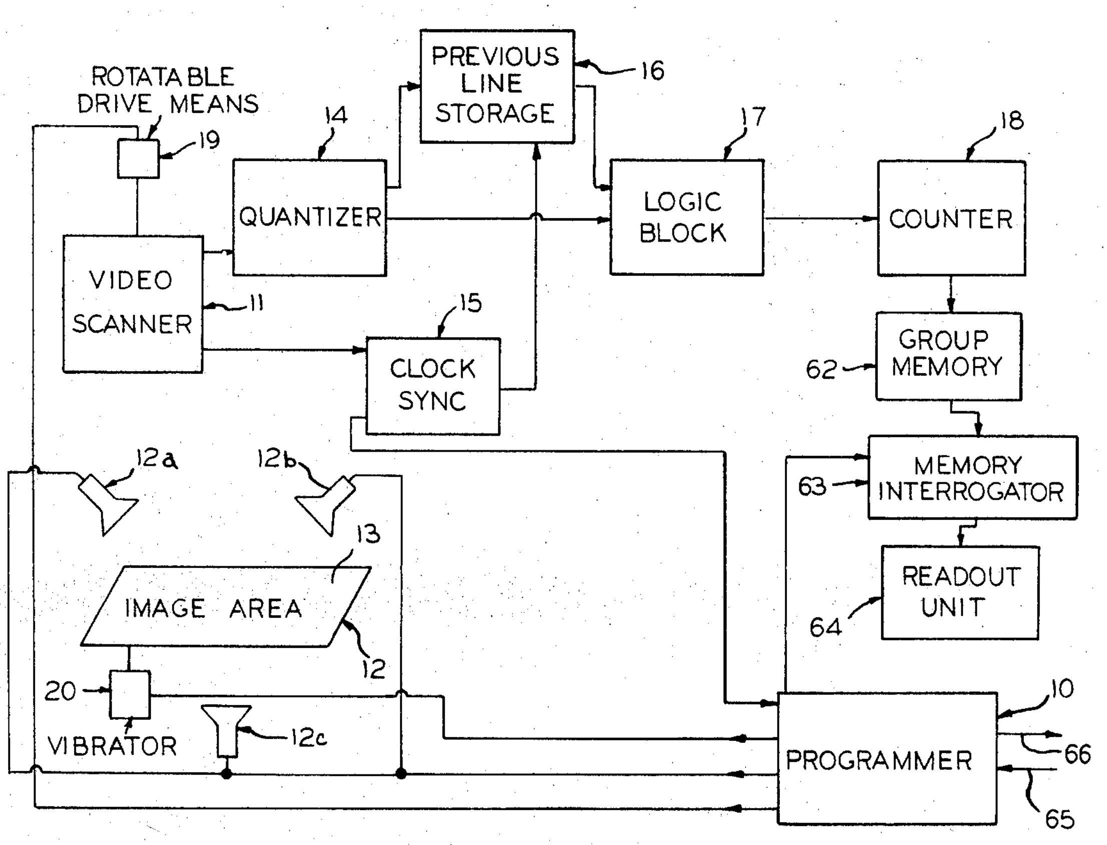
FIG. 1 is a general block diagram of the present invention.

Referring to the drawings and particularly to FIG. 1, a general block diagram of the invention is shown, wherein a video scanner 11 that may be in the form of a vidicon camera system is mounted in superimposed relation to a horizontally extending platform or table 12 on which is an image area 13 to be scanned or swept by the scanner 11. Piece parts are arranged on the table 12 within the image area for counting and may be fed to and/or unloaded from the image area by a hopper or any other suitable means.

The video scanner 11 produces an analogue representation of the scanned image area and delivers same to a quantizer 14. During a scanning operation, a sync pulse is also produced by the scanner and delivered to a clock circuit 15. The clock 15 clocks the information delivered from the quantizer to a previous line storage register 16 as the information is moved through the register. A logic block 17 receives the output from the storage register 16 and the quantizer to compare each successive line scan with the immediately previous line scan and determine the proper counting decisions. The output of the logic block 17 is sent to a counter 18 that accumulates the count of the piece parts.

The video scanner 11 generates sequential image area line scans across the image area 13, and may be rotated by a drive means 19 to scan the image area successively at different angulations. Any suitable electrical or mechanical device may be provided for the drive means and it may be preprogrammed with the counting operation. A suitable vidicon camera system that would produce scan requirements to obtain a line to line comparison, as seen in FIG. 4, could be employed. Fairchild Camera Co. makes a system that could be employed upon slight modification to provide the proper scan requirements. A commercial system scans with an interlace raster that would not work here. The present system also requires that the electron beam be blanked during the period of retrace.

In order to separate the piece parts on the image area and lay them flat for accurate counting, the table 12 is mounted on a vibrator 20 of any suitable type. Preferably, the vibrator may comprise an acoustical shaker operable at a variable frequency, intensity and duration so that it may be adjusted for the configuration of a piece part. The frequency, intensity and duration will also be preprogrammed according to the piece part counted. Further, the table 12 will be suitably vibrated between differential angular scanning operations to reorient the piece parts and further enhance the accuracy of the counter.

Illumination of the table image area 13 to enhance the video scanning operation may be accomplished by any suitable system to permit lighting from different angles and/or from below the image area. Where the image area is lighted from below, it is transparent to the light energy. As seen in FIG. 1, lighting units 12*a* and 12 *b* are shown to provide lighting from above the image area at different angles, while a lighting unit 12*c* is shown below the image area. Any number of lighting units at desired angles may be provided, all or some of which may have controllable variable intensity. Illumination may be by visible or other radiant energy, and the vidicon camera system would be compatibly sensitive thereto.

A programmer 10 preprograms, according to the piece part to be counted, the direction of scanning paths, the number of scanning paths for counting of a group of piece parts, the frequency, intensity and duration of vibration of the vibrated image area, and the angles and intensity of lighting, as well as other functions hereinafter described.

Figure 2:
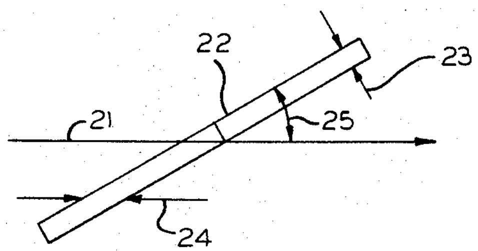
FIG. 2 is a diagrammatic view of a piece part and a line scan.

In FIG. 2, a line scan 21 is shown in association with an illustrative piece part 22 for exemplifying the operation of the counter. Assuming in this example that the piece part 22 is a cylinder, its diameter is represented at 23, while the scan detected length is represented at 24, and the angle at which the piece part extends relative to the direction of scan is represented at 25. With the piece part lying at an angle 25 to the direction of the scan 21, the counter would identify only the dimension 24 which is greater than the diameter 23 of the cylinder, and in this case, the following conditions would prevail:

$\sin 25 = 23/24$ $24 = 23/\sin 25$ $24 > 23$ for all $25 < 90°$ $24 = 23$ for all $25 = 90°$ The probability of a cylinder piece part like 22 lying at right angles to the direction of scan 21 is small, but possible. Thus, counting by identifying only the "greater than" measurement ($24 > 23$) at least two counts or image area scanning operations would be required separated by some angle of rotation of the video scanner 11. For greater accuracy more rotations and counts could be performed.

A counting operation would commence following the conclusion of the vibration of the table 12, and would include sequential scanning of the image area 13. The video scanner would produce a beam of a diameter so that the line scan sent would be equal to the beam diameter. At the end of each horizontal line scan, the beam would be advanced vertically and reset horizontally until the entire image area has been scanned. At the conclusion of a scanning operation, as already mentioned, either or both the video scanner 11 and the table 12 could be rotated to provide a scanning path at an angular relation to the normal path, and the table 12 could be vibrated in a rotational and translational manner to reorient the piece parts. Also, the illumination direction and intensity could be changed. FIG. 4 illustrates the normal scan path 26, a scan path 27 at about 45° from the normal path, and a scan path 28 at about 135° to the normal scan path. Other angular relationships to the normal scan path could be provided.

The video scanner 11 in the form of a vidicon camera system produces an output that is an analogue representation of the scanned image area. Alternatively, a photosensitive tube having as its line source a cathode ray tube may be employed to provide an output as a transparent or as a refraction scanner. As already mentioned, the image area 13 may be defined as a transparent or translucent panel that may be illuminated from below as well as from above.

Figure 3:
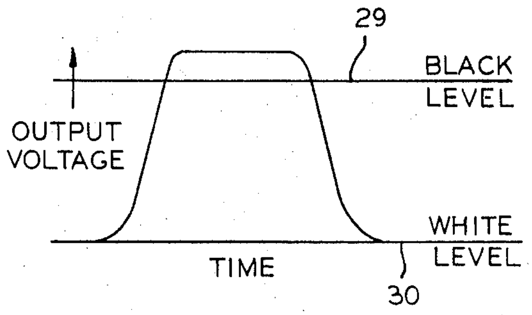
FIG. 3 is a graphical illustration of a video representation of a scanned image.

If the piece part scanned is of constant density, the analogue output of the video scanner may be defined as a video representation of the scanned image of essentially two levels. For purposes herein, these levels will be called black and white. As seen in FIG. 3, a graphical illustration of time plotted on the horizontal axis against output voltage plotted on the vertical axis shows that the presence of a piece part will result in the production of a black level 29 at the output of the video scanner, while the absence of a piece part will result in a white level 30. The duration of the black level will be equivalent to the time it takes the electron beam of the video scanner to pass over the piece part. At the completion of every horizontal line scan, the beam of the scanner will be advanced vertically and reset horizontally. Resetting of the beam will result in sending a sync pulse to the clock circuit 15.

The analogue output of the video scan 11 will be quantized by the quantizer 14 whenever the output reaches a predetermined black level. The quantizer may be in the form of a bistable multivibrator which will condition in one of two states corresponding to the binary equivalent of 1 (one) or 0 (zero), where the one state will represent the black level while the zero state will represent the white level or the absence of any part. The signal from the quantizer 14 is in the form of a digital pulse having constant amplitude by a duration equivalent to the time it takes the scanning beam to cross a piece part. An example of the signals for the line scan 31 in FIG. 5 is at 31*a* in FIG. 6, the pulse 31*b* constituting an analogue representation of the piece part 32. The previous line scan 34, FIG. 5, produced the signal 34*a* , FIG. 6, the pulse 34*b* of which represents the analogue representation of the piece part 32. It may be noted that the pulse 31*b* is of longer duration than the previous line pulse 34*b*. The line scan previous to the line scan 34 is designated by the numeral 35, the representation of which as a signal is shown in FIG. 6 at 35*a*, where no white to black or black to white transitions exist. Viewing the line scan signals 31*a*, 34*a* and 35*a*, it will be appreciated that since a black to white transition is made by the line scan signal 34*a* previous to the black to white transition made by the line scan signal 31*a*, the conditions for a count are not present. But since the previous line scan signal 35*a* to the line scan signal 34*a* does not have any white to black or black to white transitions, the line scan signal 34*a* will effect a count. Thus, when the conditions are correct, as illustrated by the logic block 17, a count will be added to the counter 18.

The truth table of FIG. 7 illustrates the present and previous line scan conditions necessary in order to obtain a count. The count is extracted at the output if "this line " is a one and the "previous line" is a zero, or only when a transition is made from black to white. None of the other possible conditions ("this line" is zero and "previous line" is zero; "this line" is one and "previous line" is one; or "this line" is zero and "-previous line" is one) will produce an output count.

Where the piece part is shaped in a "U", it can be appreciated that upon encountering with line scans an open part of the U first, two counts will be generated. Thus, to identify such a piece part as only a single part, a count must be subtracted from the counter, and such is accomplished by ascertaining a certain condition that will occur as the part is scanned at the bottom of the U. Referring now to FIGS. 9 and 10, a U-shaped part 36 and the information generated by line scans 36*a*, 36*b*, 36*c* and 36*d* illustrates the identification of a U-shaped member. In FIG. 10, the 1 (one) represents the black information while the 0 (zero) represents the white information, and as can be seen, the black information converges as the line scans approach the bottom of the U, and when comparing the black and white information of line scan 36*d* with the previous line scan 36*c*, such would indicate that a number or count should be subtracted.

Referring now to a more detailed operation of the counter in view of the more detailed block diagram shown in FIG. 8, the analogue output of the quantizer 14 in the form of a pulse will encounter the pulse with discriminator 36 that will compare the pulse with the preprogrammed width as established by the width programmer 37. If the information received from the quantizer is of acceptable width, it will be passed onto the previous line storage register 16 for subsequent usage as "-previous line" information, and through 38 at "this line" information to the and gate 39 and the differentiator 40. The storage register 16 may be of any type sufficient to store or hold the information of one horizontal line scan. Exemplary of a suitable storage register would include a flip-flop shift register, a magnetic core shift register, or a magneto stricture delay line. At the and gate 39, the pulse on "this line" 38 will be compared with the pulse of the same position from the "-previous line" 41 as issued from the previous line storage register 16. In the case that the "previous line" has no information, such as the line scan 35 in FIG. 5, the and gate 39 will remain closed. The pulse going through the differentiator 40 will be changed in form to the signal 40*a* (FIG. 6).

The differentiator may comprise a standard RC circuit with a time constant sufficient to form a pulse of duration great enough to trigger a one-shot multivibrator 42. The use of an RC circuit allows the conversion of a step function input to a differentiated signal output. The rise and fall of this output signal is equal to tau ($\tau$). The RC circuit, input and output signals relative thereto are shown in FIG. 11. By changing the RC combination the rise and fall times of the pulse may be varied. This ability is used to ensure that the width of the differentiated pulse is smaller than the required resolution of the system. The pulses that are formed respond only to a step function as was mentioned previously, therefore a pulse output will only occur when a part is first encountered and when the beam passes off of the part. These transitions correspond to white to black and black to white.

The circuit 43 may be of any type that will permit current to pass in one direction but not the other direction, and thus for this application only the negative portion of the wave form, 43*a* of FIG. 6, will be used. If the negative pulse is of proper duration, it will trigger the one-shot multivibrator 42 whose pulse shall be of such duration to insure a proper counting operation. If the output pulse of the multivibrator 42 is presented to the and gate 44 when it is open, a count will be recorded by the counter 18.

As already explained, the part is counted only once and such is assured by reference to the truth table of FIG. 7. To prevent a count from occurring during the time that both the "previous line" and "this line" are both in a black state, the following operation is conducted. The output from the *m* bit delay line of the previous line storage register 16, which has storage sufficient to store only one line of information, presents the output to "previous line" 41 from the previous line scan at the instant of time that a new line is being scanned. The timing of this information is performed by the clock circuit 15 which clocks the information through the previous line storage register 16 at a rate compatible with the resolution and scanning speed of the system. If the output from the "previous line" 41 and "this line" 38 are both in the black state, the AND gate 39 will be opened thereby causing a change of state in the bistable multivibrator 45, which in turn will trigger the one-shot multivibrator 46. The output from the one-shot multivibrator 46 will be a pulse of sufficient duration to insure the closing of the and gate 44 to prevent a count from being made.

The logic decision for subtracting a count, as is necessary when counting U-shaped parts, includes the two four bit shift registers 47 and 48, and associated logic elements 49, 50, 51, 52, 53, 54, 59 and 60. The four bit shift register 47 receives the output from the "previous line" 41, while the four bit shift register 48 receives the output from the "this line" 38. Also the information to the four bit shift register 48 is clocked therethrough by the clocking circuit 15. The logic elements 51, 52, 53 and 54 are AND gates that receive the outputs of both four bit shift registers and which will open only when the proper conditions are present. Inverters 49 and 50 are arranged between the AND gates 52 and 53 and the four bit shift register 47. The logic element 59 constitutes an AND gate that receives the outputs of the AND gates 51, 52, 53 and 54 and will only open upon the opening of each of the AND gates 51—54. A signal is received from the AND gate 59 by the subtractor 60 when this gate is open in order to subtract the necessary count from the counter 18. And gates 51, 52, 53, 54 and 55 perform a compare on the information stored in registers 47 and 48. When these registers hold 1001 and 1111 conditions, respectively, a signal will be sent to the subtractor gate 60 to subtract one count from the counter 18. This compare indicates that a part originally thought to be two pieces is really one, by the fact that it has merged.

The output of the counter 18 is delivered to a group memory 62 which is comprised of a plurality of memories to hold each successive count during an overall counting operation. Any number of memories would be provided in the group memory, this being primarily dependent upon the range of counts desired. A memory interrogator 63 sweeps the information of the memories from the group memory 62 and determines the count most commonly found in response to the programmer 10, and delivers this count, as digital data, to a readout unit 64. Any type of device may comprise the readout unit, or it could have several outputs to a plurality of devices. The readout unit 64 may be considered to provide an alpha numeric output, that may be variable or constant. The unit 64 may comprise a printer that could print the overall count numerically on hard copy, or even by weight.

A command input 65 is provided for the programmer 10 to initiate any counting cycle in response to a signal that could come from an event or be manually issued. The programmer itself will stop the count at the conclusion of the counting operation, and then a command output 66 may be utilized to give a signal for controlling a happening or event such as discharging the counted articles from the image area and loading the image area with another group of articles to be counted. The programmer would also function to control the number of counts to be taken during a counting operation, and to reset the system at the conclusion of a counting operation.

From the foregoing, it can be appreciated that the piece part counter of the present invention is capable of quickly providing an accurate count of piece parts. While the output of the counter 18 is a numerical count of the piece parts, it should also be appreciated that through proper programming, it could also be translated to weight where such a measurement would be needed such as for shipping information.

It will be understood that modifications and variations may be effected without departing from the scope of the novel concepts of the present invention, but it is understood that this application is to be limited only by the scope of the appended claims.

We claim:

1. A parts counter for counting piece parts on a surface within a predetermined image area comprising a video scanner arranged adjacent said surface for generating sequential image area scans across said area and producing an analogue representation of the scanned image area and a sync pulse output between each line scan during an image area scan, a quantizer receiving the analogue output of said scanner and quantizing same, a previous line storage register and a logic block receiving the output information of said quantizing circuit, said previous line storage register storing one line scan of information, said logic block also receiving the output of said storage register and determining the proper counting decisions by comparing each successive line scan with the immediate previous line scan, a clock circuit receiving the sync pulse output from said scanner for each line scan and clocking the information through the previous line storage register, a counter receiving and registering the output of said logic block, and means for reorienting the piece parts between image area scans.

2. A parts counter as defined in claim 1, and said reorienting means including means for shaking the piece parts in the image area in a rotational and translational direction to cause the parts to separate and lay flat for accurate counting.

3. A parts counter as defined in claim 1 and illuminating means for said image area.

4. A parts counter as defined in claim 1, wherein said image area includes a translucent panel, and illuminating means above and below said panel.

5. A parts counter as defined in claim 1, and said reorienting means including vibratory means supporting said image area.

6. A parts counter as defined in claim 5, wherein drive means is provided for said vibratory means with variable frequency, intensity and duration of vibration.

7. A parts counter as defined in claim 3, wherein means is provided for varying the intensity and angle of illumination of said illuminating means.

8. A parts counter as defined in claim 1, and means for mounting said video scanner to change direction of said scanner and a subsequent scan between image area scans.

9. A parts counter as defined in claim 1, means for driving said video scanner to various angular positions relative to said image area between image area scans, means for illuminating said image area, and programming means for controlling the number of image area scans, the operation of the video scanner drive means, the operation of the piece part reorienting means, and the operation of the image area illuminating means.

10. A parts counter as defined in claim 1, and further including a memory means receiving the output of said counter to store the count of each image area scan, a programming means, means responding to said programming means for sweeping said memory means at the completion of a predetermined number of image area scans to compare the counts made by the count means and stored in the memory means and upon sensing a predetermined number of duplicate counts causing said memory sweeping means to produce an output of that duplicate count, and a readout unit receiving the output of said memory sweeping means.

11. A parts counter for counting piece parts on a surface within a predetermined image area comprising a video scanner arranged adjacent said surface for generating sequential image area scans of the image area and producing an analogue representation of the scanned image area, means receiving the output of said video scanner to count means for reorienting the piece parts between image area scans including means imparting vibratory motion to said image area surface.

12. A parts counter as defined in claim 11, and means for reorienting the piece parts on the image area between image area scans.

13. A parts counter as defined in claim 12, and said reorienting means including a vibratory device connected to said image area and capable of variable frequency, intensity and duration of vibration.

14. A parts counter as defined in claim 13, wherein said image area comprises a translucent panel, and illuminating means above and below said panel to illuminate the piece parts during a scan, the intensity and angle of illumination being variable.

15. A parts counter as defined in claim 14, and means mounting said video scanner to change the direction of said scanner and a subsequent scan between image area scans.

16. A parts counter as defined in claim 14, and programming means for controlling, the number of image area scans, the scanner directional change means, the vibratory device, and the illuminating means.

UNITED STATES PATENT OFFICE

CERTIFICATE OF CORRECTION

Patent No. 3,551,593 Dated December 29, 1970

Henri L. Gaudriot and
LeRoy J. Ryan, Jr.

It is certified that error appears in the above identified patent and that said Letters Patent are hereby corrected as shown below:

In the Claims, Col. 8, line 5, after "count", insert --the piece parts during an image area scan,--;

In the Claims, Col. 8, line 8, change the period to a comma and add --memory means receiving the output of said count means for retaining the count of each image area scan during a counting operation, a programming means, means responding to said programming means for sweeping said memory means at the completion of a predetermined number of image area scans to compare the counts made by the count means and stored in the memory means and upon sensing a predetermined number of duplicate counts causing said memory sweeping means to produce an output of that duplicate count, and a readout unit receiving the output of said memory sweeping means.--.

Signed and sealed this 18th day of May 1971.

(SEAL)
Attest:

EDWARD M.FLETCHER,JR.
Attesting Officer

WILLIAM E. SCHUYLER, JR.
Commissioner of Patents